(12) United States Patent
Dogome

(10) Patent No.: US 11,969,879 B2
(45) Date of Patent: Apr. 30, 2024

(54) SUBSTRATE ACCOMMODATING DEVICE AND PROCESSING SYSTEM

(71) Applicant: TOKYO ELECTRON LIMITED, Tokyo (JP)

(72) Inventor: Masahiro Dogome, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 139 days.

(21) Appl. No.: 17/682,754

(22) Filed: Feb. 28, 2022

(65) Prior Publication Data

US 2022/0274260 A1    Sep. 1, 2022

(30) Foreign Application Priority Data

Feb. 26, 2021  (JP) .................................. 2021-029958

(51) Int. Cl.
| | | |
|---|---|---|
| *H01L 21/677* | (2006.01) | |
| *B25J 11/00* | (2006.01) | |
| *B25J 15/00* | (2006.01) | |

(52) U.S. Cl.
CPC ....... *B25J 11/0095* (2013.01); *B25J 15/0014* (2013.01)

(58) Field of Classification Search
None
See application file for complete search history.

(56) References Cited

U.S. PATENT DOCUMENTS

| 9,881,820 B2* | 1/2018 | Wong ................ H01L 21/67383 |
|---|---|---|
| 11,631,607 B2* | 4/2023 | Toyomaki ......... H01L 21/67363 |
| | | 438/689 |
| 2019/0122870 A1* | 4/2019 | Ishizawa ........... H01J 37/32862 |

FOREIGN PATENT DOCUMENTS

JP    2020-096149 A    6/2020

* cited by examiner

*Primary Examiner* — Michael S Lowe

(74) *Attorney, Agent, or Firm* — XSENSUS LLP

(57) ABSTRACT

A substrate accommodating device accommodating a substrate transferred by a transfer device having an end effector configured to hold a substrate and a member including a consumable part disposed in a substrate processing apparatus for processing the substrate includes a container. A first opening through which the end effector holding the substrate passes is formed on a sidewall of the container. A recess into which front ends of the end effector are inserted is formed on an inner surface of the container facing the first opening.

8 Claims, 11 Drawing Sheets

SUBSTRATE ACCOMMODATING DEVICE AND PROCESSING SYSTEM

CROSS-REFERENCE TO RELATED APPLICATIONS

This application claims priority to Japanese Patent Application No. 2021-029958 filed on Feb. 26, 2021, the entire contents of which are incorporated herein by reference.

TECHNICAL FIELD

Various aspects and embodiments of the present disclosure relate to a substrate accommodating device and a processing system.

BACKGROUND

For example, Japanese Patent Application Publication No. 2020-96149 discloses a transfer device for transferring a consumable part in a processing apparatus as well as a substrate. Accordingly, the consumable part can be replaced without opening a chamber of the processing apparatus to the atmosphere, thereby reducing a downtime of the processing apparatus for performing processing at a low pressure.

SUMMARY

The present disclosure provides a substrate accommodating device and a processing system capable of reducing a footprint of the entire system.

One aspect of the present disclosure provides a substrate accommodating device accommodating a substrate transferred by a transfer device having an end effector configured to hold a substrate and a member including a consumable part disposed in a substrate processing apparatus for processing the substrate includes a container. A first opening through which the end effector holding the substrate passes is formed on a sidewall of the container. A recess into which front ends of the end effector are inserted is formed on an inner surface of the container facing the first opening.

BRIEF DESCRIPTION OF THE DRAWINGS

The objects and features of the present disclosure will become apparent from the following description of embodiments, given in conjunction with the accompanying drawings, in which.

DETAILED DESCRIPTION

Hereinafter, embodiments of a substrate accommodating device and a processing system will be described in detail with reference to the accompanying drawings. The following embodiments are not intended to limit the substrate accommodating device and processing system of the present disclosure.

In the case of transferring a substrate or a consumable part, the substrate or the consumable part is placed on an end effector disposed at a front end of a robot arm such that a reference position (e.g., the center of gravity) thereof is located at a predetermined position on the end effector. When the consumable part is a ring-shaped component, e.g., as an edge ring or the like, and bigger than the substrate, if the consumable part is placed too close to the front end side of the end effector, the consumable part may fall from the end effector by the movement of the end effector. Therefore, it is necessary to prevent the position of the consumable part from being placed too close to the front ends of the end effector. Accordingly, the consumable part is placed on the end effector such that the reference position of the consumable part is away from the front ends of the end effector.

On the other hand, in the case of transferring a substrate smaller than the consumable part, if the substrate is placed on the end effector such that the reference position of the consumable part coincides with the reference position of the substrate at the time of transferring the consumable part, the front ends of the end effector will protrude from under the substrate. If the portion of the end effector protruding from under the substrate is large, the end effector will become obstructive at the time of transferring the substrate into an apparatus that has no space for accommodating the consumable part, which makes it difficult to load the substrate to a predetermined position in the apparatus.

In order to load the substrate into the predetermined position in the apparatus without being obstructed by the end effector, one may consider increasing the space in the apparatus that has no space for accommodating the consumable part. In such case, however, the footprint of the apparatus will increases and, thus, the footprint of the entire system will also increase.

Accordingly, the present disclosure provides a technique capable of suppressing an increase in the footprint of the entire system.

First Embodiment

<Configuration of Processing System 1>

Figure 1:
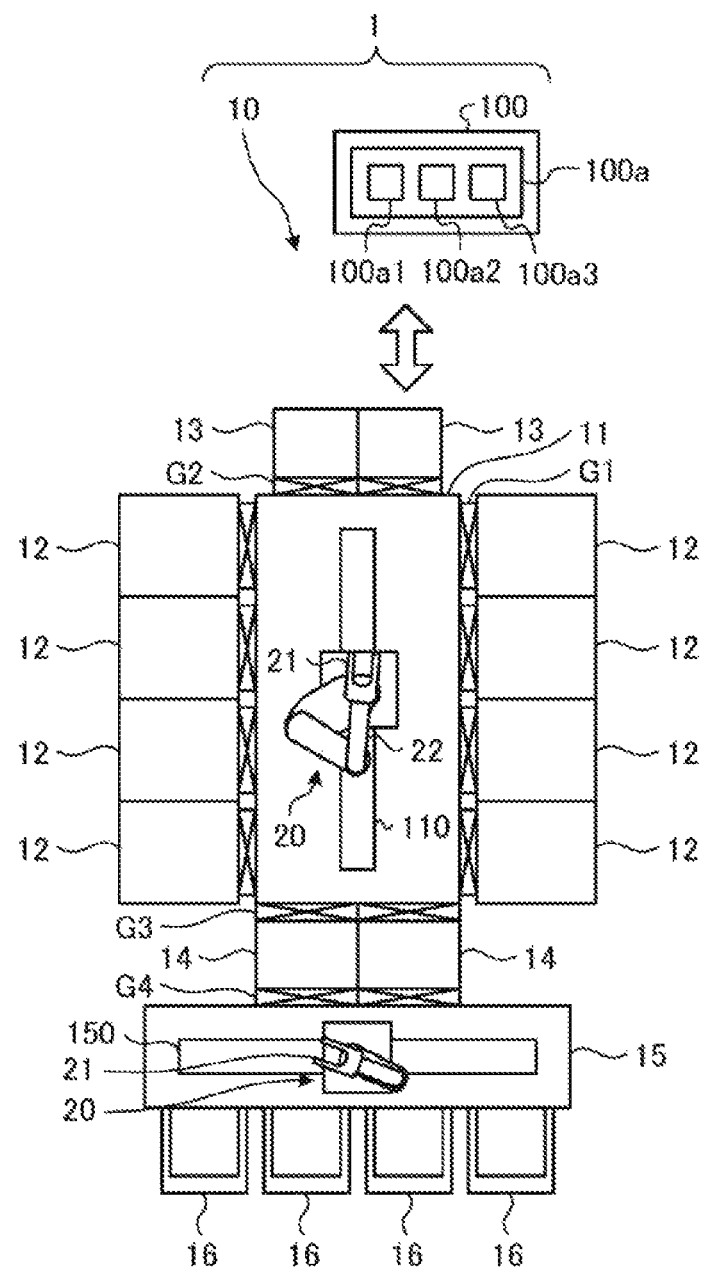
FIG. 1 is a top view showing an example of a processing system according to an embodiment.

FIG. 1 is a top view showing an example of a configuration of the processing system 1 according to an embodiment. In FIG. 1, some of the internal components of the apparatus are illustrated transparently for the sake of convenience. The processing system 1 includes a main body 10 and a controller 100 for controlling the main body 10.

The main body 10 includes a vacuum transfer module 11, a plurality of processing modules 12, a plurality of ashing modules 13, a plurality of load-lock modules 14, and an atmospheric transfer module 15. The plurality of processing modules 12 are connected to two opposing sidewalls of the vacuum transfer module 11 through gate valves G1. The processing module 12 is an example of a substrate processing apparatus. In the example of FIG. 1, eight processing modules 12 are connected to the vacuum transfer module 11. However, the number of the processing modules 12 connected to the vacuum transfer module 11 may be seven or less, or nine or more.

Figure 2:
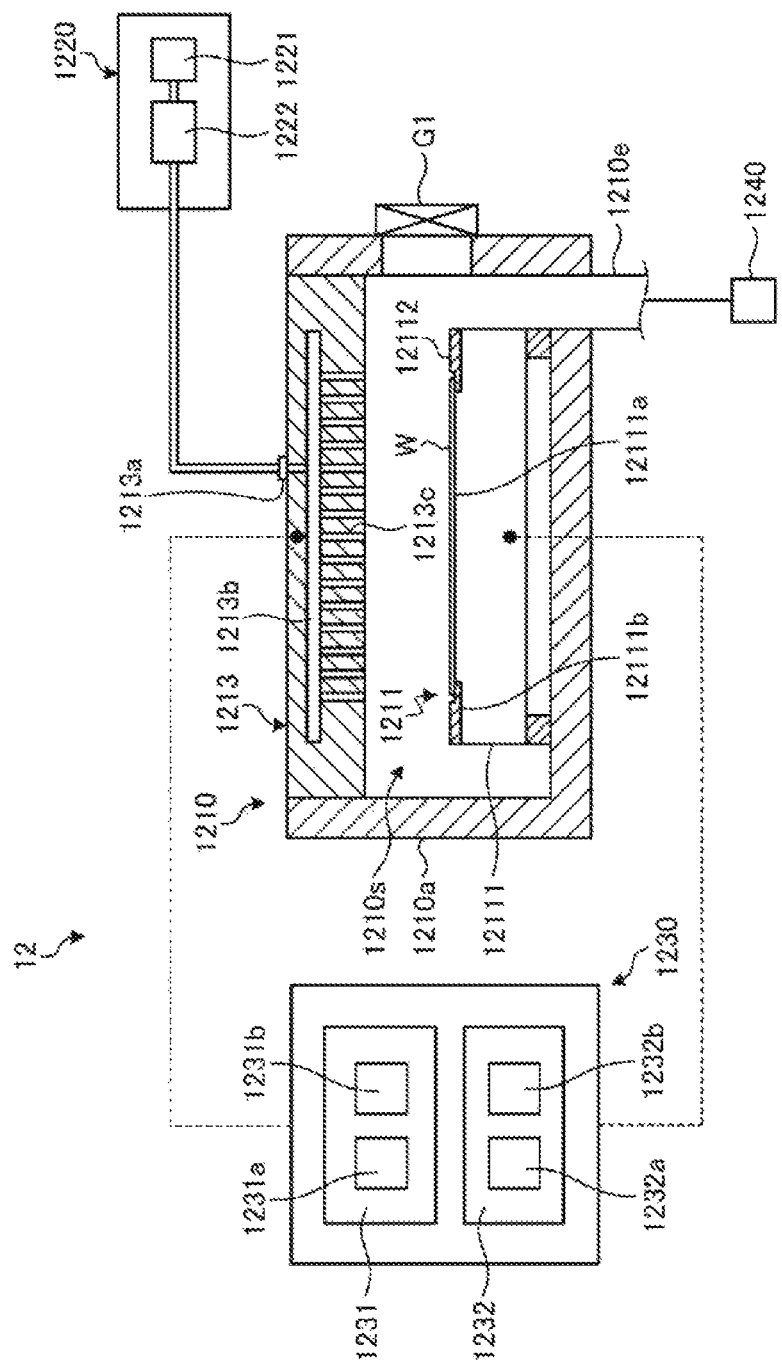
FIG. 2 is a schematic cross-sectional view showing an example of a processing module.

Each of the processing modules 12 performs processing such as etching, film formation, or the like on a substrate W to be processed. The processing module 12 is an example of the substrate processing apparatus. FIG. 2 is a schematic cross-sectional view showing an example of the processing module 12. In the present embodiment, the processing module 12 is a capacitively coupled plasma processing apparatus, for example. The processing module 12 includes a plasma processing chamber 1210, a gas supplier 1220, a power supply 1230, and an exhaust system 1240. The processing module 12 further includes a substrate support 1211 and a gas inlet portion. The gas inlet portion is configured to introduce at least one processing gas into the plasma processing chamber 1210. The gas inlet portion includes a shower head 1213. The substrate support 1211 is disposed in the plasma processing chamber 1210. The shower head 1213 is disposed above the substrate support 1211. In one embodiment, the shower head 1213 constitutes at least a part of a ceiling of the plasma processing chamber 1210. The plasma processing chamber 1210 has a plasma processing space 1210s defined by the shower head 1213, a sidewall 1210a of the plasma processing chamber 1210, and the substrate support 1211. The plasma processing chamber 1210 has at least one gas supply port for supplying at least one processing gas to the plasma processing space 1210s, and at least one gas discharge port for discharging a gas from the plasma processing space. The sidewall 1210a is grounded. The shower head 1213 and the substrate support 1211 are electrically isolated from the plasma processing chamber 1210.

The substrate support 1211 includes a main body 12111 and a ring assembly 12112. The main body 12111 has a central region (substrate supporting surface) 12111a for supporting the substrate (wafer) W and an annular region (ring supporting surface) 12111b for supporting the ring assembly 12112. The annular region 12111b of the main body 12111 surrounds the central region 12111a of the main body 12111 in plan view. The substrate W is disposed on the central region 12111a of the main body 12111, and the ring assembly 12112 is disposed on the annular region 12111b of the main body 12111 to surround the substrate W on the central region 12111a of the main body 12111. In one embodiment, the body 12111 includes a base and an electrostatic chuck. The base includes a conductive member. The conductive member of the base functions as a lower electrode. The electrostatic chuck is placed on the base. An upper surface of the electrostatic chuck has a substrate supporting surface 12111a. The ring assembly 12112 includes one or multiple annular members, and at least one of them is an edge ring. Although it is not illustrated, the substrate support 1211 may include a temperature control module configured to control a temperature of at least one of the electrostatic chuck, the ring assembly 12112, or the substrates to a target temperature. The temperature control module may include a heater, a heat transfer medium, a flow path, or a combination thereof. The heat transfer fluid such as brine or a gas flows through the flow path. Further, the substrate support 1211 may include a heat transfer gas supplier configured to supply a heat transfer gas to a space between the backside of the substrate W and the substrate supporting surface 12111a.

The shower head 1213 is configured to introduce at least one processing gas from the gas supplier 1220 into the plasma processing space 1210s. The shower head 1213 has at least one gas supply port 1213a, at least one gas diffusion space 1213b, and a plurality of gas inlet ports 1213c. The processing gas supplied to the gas supply port 1213a passes through the gas diffusion space 1213b and is introduced into the plasma processing space 1210s from the gas inlet ports 1213c. Further, the shower head 1213 includes a conductive member. The conductive member of the shower head 1213 functions as an upper electrode. The gas inlet portion may include, in addition to the shower head 1213, one or multiple side gas injectors (SGI) attached to one or multiple openings formed in the sidewall 1210a.

The gas supplier 1220 may include at least one gas source 1221 and at least one flow controller 1222. In one embodiment, the gas supplier 1220 is configured to supply at least one processing gas from the corresponding gas source 1221 to the shower head 1213 through the corresponding flow rate controller 1222. The flow rate controllers 1222 may include, e.g., a mass flow controller or a pressure-controlled flow rate controller. Further, the gas supplier 1220 may include one or more flow rate modulation devices for modulating the flow rate of at least one processing gas or causing it to pulsate.

The power supply 1230 includes an RF power supply 1231 connected to the plasma processing chamber 1210 through at least one impedance matching circuit. The RF power supply 1231 supplies at least one RF signal (RF power), such as a source RF signal and a bias RF signal, to either one or both of the conductive member of the substrate support 1211 and the conductive member of the shower head 1213. Accordingly, plasma is produced from at least one processing gas supplied to the plasma processing space 1210s. Hence, the RF power supply 1231 may function as at least a part of a plasma generator configured to generate plasma from one or more processing gases in the plasma processing chamber 1210. Further, by supplying the bias RF signal to the conductive member of the substrate support 1211, a bias potential is generated at the substrate W, and ions in the produced plasma can be attracted to the substrate W.

In one embodiment, the RF power supply 1231 includes a first RF generator 1231a and a second RF generator 1231b. The first RF generator 1231a is connected to either one or both of the conductive member of the substrate support 1211 and the conductive member of the shower head 1213 through at least one impedance matching circuit. Further, the first RF generator 1231a is configured to generate a source RF signal (source RF power) for plasma generation. In one embodiment, the source RF signal has a frequency within a range of, e.g., 13 MHz to 150 MHz. In one embodiment, the first RF generator 1231a may be configured to generate multiple source RF signals having different frequencies. The generated one or multiple source RF signals are supplied to either one or both of the conductive member of the substrate support 1211 and the conductive member of the shower head 1213. The second RF generator 1231b is connected to the conductive member of the substrate support 1211 through at least one impedance matching circuit, and is configured to generate a bias RF signal (bias RF power). In one embodiment, the bias RF signal has a frequency lower than that of the source RF signal. In one embodiment, the bias RF signal has a frequency within a range of, e.g., 400 kHz to 13.56 MHz. In one embodiment, the second RF generator 1231b may be configured to generate multiple bias RF signals having different frequencies. The generated one or multiple bias RF signals are supplied to the conductive member of the substrate support 1211. In various embodiments, at least one of the source RF signal and the bias RF signal may pulsate.

The power supply 1230 may include a DC power supply 1232 connected to the plasma processing chamber 1210. The DC power supply 1232 includes a first DC generator 1232a and a second DC generator 1232b. In one embodiment, the first DC generator 1232a is connected to the conductive member of the substrate support 1211 and is configured to generate a first DC signal. The generated first bias DC signal is applied to the conductive member of the substrate support 1211. In one embodiment, the first DC signal may be applied to another electrode, such as an electrode in an electrostatic chuck. In one embodiment, the second DC generator 1232b is connected to the conductive member of the shower head 1213 and is configured to generate a second DC signal. The generated second DC signal is applied to the conductive member of the shower head 1213. In various embodiments, at least one of the first and second DC signals may pulsate. The first DC generator 1232a and the second DC generator 1232b may be provided in addition to the RF power supply 1231, and the first DC generator 1232a may be provided instead of the second RF generator 1231b.

The exhaust system 1240 may be connected to a gas outlet 1210e disposed at a bottom portion of the plasma processing chamber 1210, for example. The exhaust system 1240 may include a pressure control valve and a vacuum pump. The pressure control valve adjusts a pressure in the plasma processing space 1210s. The vacuum pump may include a turbo molecular pump, a dry pump, or a combination thereof.

Referring back to FIG. 1, the plurality of ashing modules 13 are connected to one of the two remaining sidewall of the vacuum transfer module 11 through gate valves G2. The ashing modules 13 removes a mask or the like remaining on the substrate W that has been processed by the processing module 12 by ashing. Although two ashing modules 13 are connected to the vacuum transfer module 11 in the example of FIG. 1, the number of ashing modules 13 connected to the vacuum transfer module 11 may be one, or may be three or more.

Figure 3:
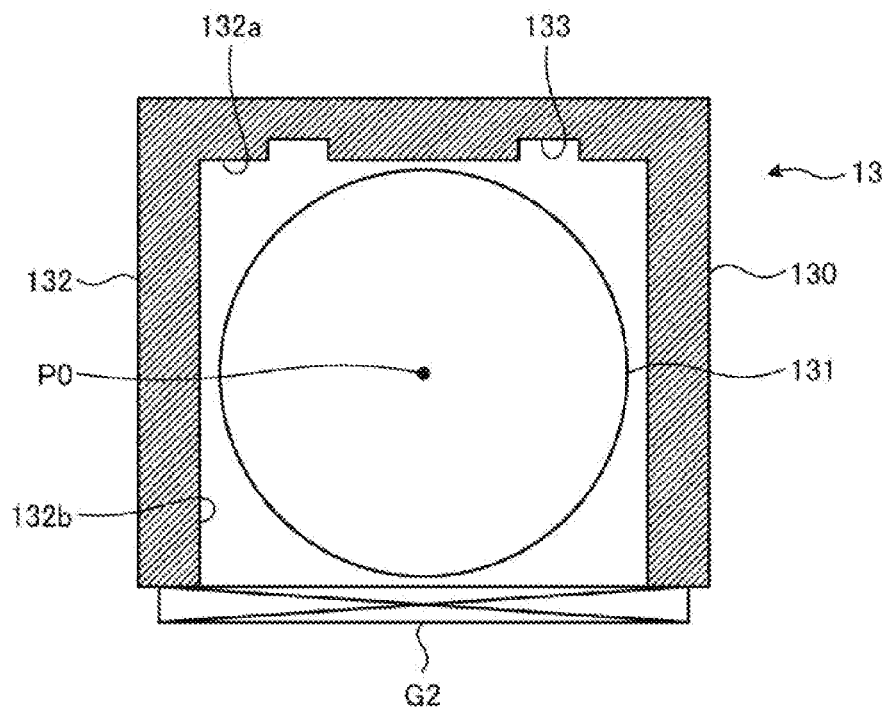
FIG. 3 is a horizontal cross-sectional view showing an example of an ashing module according to a first embodiment.

FIG. 3 shows an example of the ashing module 13 according to the first embodiment. The ashing module 13 has a container 130. A stage 131 on which the substrate W is placed is disposed in the container 130. The reference position (e.g., the center of gravity) of the stage 131 is defined as a position P0. A sidewall 132 of the container 130 has an opening 132b through which an end effector 21 holding the substrate W or the like passes. The opening 132b is an example of a first opening. The opening 132b is opened and closed by the gate valve G2.

Further, a recess 133 into which the front ends of the end effector 21 are inserted is formed on an inner surface 132a of the container 130 facing the opening 132b. In the example of FIG. 3, the recess 133 is formed on the surface 132a of the sidewall 132 of the container 130 facing the opening 132b. The ashing module 13 is an example of a substrate accommodating device.

Referring back to FIG. 1, the load-lock modules 14 are connected to the other one of the two remaining sidewalls of the vacuum transfer module 11 through gate valves G3. In the example of FIG. 1, two load-lock modules 14 are connected to the vacuum transfer module 11. However, the number of load-lock modules 14 connected to the vacuum transfer module 11 may be one, or may be three or more. At least one of the two load-lock modules 14 can accommodate the substrate W, and at least one of the two load-lock modules 14 can accommodate an edge ring ER. The edge ring ER is an example of the consumable part.

Figure 4:
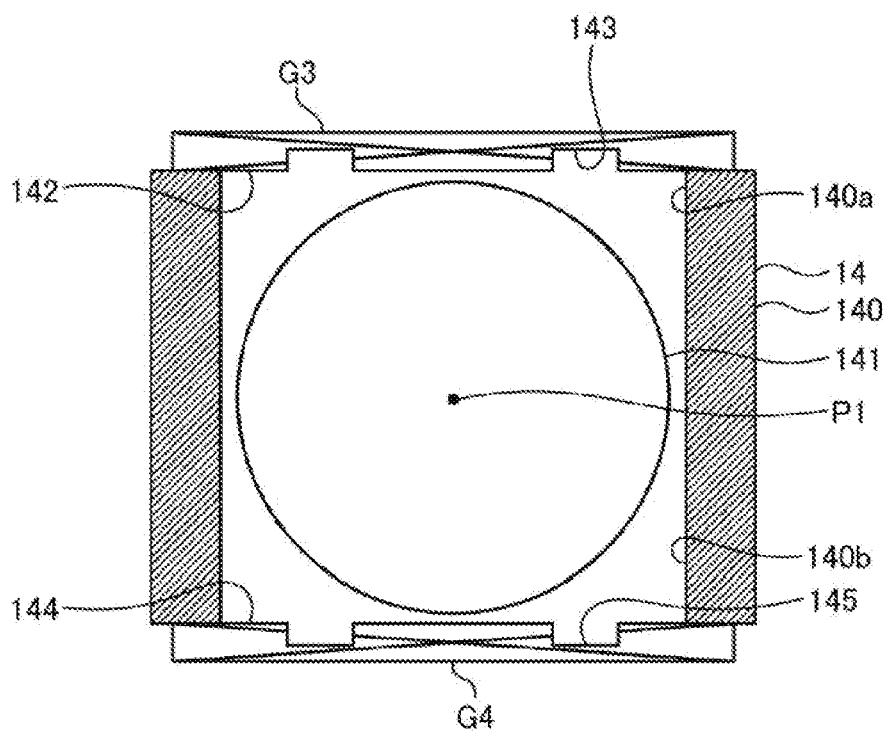
FIG. 4 is a horizontal cross-sectional view showing an example of a load-lock module according to the first embodiment.

FIG. 4 shows an example of the load-lock module 14 according to the first embodiment. In the present embodiment, the load-lock modules 14 are divided into the load-lock module 14 that temporarily accommodates the substrate W and the load-lock module 14 that temporarily accommodates the consumable part such as the edge ring ER or the like. FIG. 4 shows the load-lock module 14 that temporarily accommodates the substrate W. The load-lock module 14 may temporarily accommodate both the substrate W and the edge ring ER. The load-lock module 14 has a container 140. A stage 141 on which the substrate W is placed is disposed in the container 140. The reference position (e.g., the center of gravity) of the stage 141 is defined as a position P1. An opening 140a and an opening 140b through which the end effector 21 holding the substrate W or the like passes are formed on the sidewall of the container 140. The opening 140a is an example of the first opening, and the opening 140b is an example of a second opening. The opening 140a is opened and closed by the gate valve G3, and the opening 140b is opened and closed by a gate valve G4.

Further, an inner surface 142 of the container 140 at the gate valve G3 has a recess 143 into which the front ends of the end effector 21 that has entered the container 140 through the opening 140b are inserted. Further, an inner surface 144 of the container 140 at the gate valve G4 has a recess 145 into which the front ends of the end effector 21 that has entered the container 140 through the opening 140a are inserted. The load-lock module 14 is an example of the substrate accommodating device, and the gate valve G4 is an example of a door that opens and closes the second opening.

Referring back to FIG. 1, a transfer robot 20 is disposed in the vacuum transfer module 11. The transfer robot 20 has the end effector 21 and an arm 22. The end effector 21 holds a member. In the present embodiment, the end effector 21 holds, e.g., the substrate W, the edge ring ER, or the like. Hereinafter, the members such as the substrate W, the edge ring ER, and the like are collectively referred to as the substrate W or the like. The arm 22 moves the end effector 21. The transfer robot 20 moves in the vacuum transfer module 11 along a guide rail 110 disposed in the vacuum transfer module 11, and transfers the substrate W and the like between the processing modules 12, the ashing modules 13, and the load-lock modules 14. The transfer robot 20 may be fixed at a predetermined position in the vacuum transfer module 11 so that it does not move in the vacuum transfer module 11. The transfer robot 20 is an example of a transfer device. A pressure in the vacuum transfer module 11 is maintained at a pressure lower than the atmospheric pressure.

For each of the load-lock modules 14, the vacuum transfer module 11 is connected to one of its sidewalls through the gate valves G3, and an atmospheric transfer module 15 is connected to another one of its sidewalls through gate valves G4. When the substrate W or the like is loaded into the load-lock module 14 from the atmospheric transfer module 15 through the gate valve G4, the gate valve G4 is closed and the pressure in the load-lock module 14 is reduced from the atmospheric pressure to a predetermined pressure. Then, the gate valve G3 is opened, and the substrate W or the like is unloaded from the load-lock module 14 to the vacuum transfer module 11 by the transfer robot 20.

Further, in a state where the pressure in the load-lock module 14 is maintained at a pressure lower than the atmospheric pressure, the substrate W or the like is loaded from the vacuum transfer module 11 into the load-lock module 14 through the gate valve G3 by the transfer robot 20 and, then, the gate valve G3 is closed. Then, the pressure in the load-lock module 14 is increased to the atmospheric pressure. Next, the gate valve G4 is opened, and the substrate W or the like is unloaded from the load-lock module 14 to the atmospheric transfer module 15.

On the sidewall of the atmospheric transfer module 15 opposite to the sidewall where the gate valves G4 are disposed, are disposed a plurality of load ports 16. A container such as a front opening unified pod (FOUP) capable of accommodating a plurality of substrates W is connected to each of the load ports 16. The atmospheric transfer module 15 may be provided with an aligner module for changing the orientation of the substrate W. Further, a container capable of accommodating an edge ring ER is connected to one of the load ports 16.

The transfer robot 20 is disposed in the atmosphere transfer module 15, and has the end effector 21 and the arm 22. The pressure in the atmospheric transfer module 15 is then atmospheric pressure. The transfer robot 20 in the atmosphere transfer module 15 moves in the atmosphere transfer module 15 along a guide rail 150 and transfers the substrate W or the like between the load-lock module 14 and the container connected to the load port 16. The transfer robot 20 may be fixed at a predetermined position in the atmosphere transfer module 15 such that it does not move in the atmosphere transfer module 15. A fan filter unit (FFU) or the like is disposed at an upper portion of the atmospheric transfer module 15 so as to supply air into the atmospheric transfer module 15 after removing particles and the like therefrom to generate downflow in the atmospheric transfer module 15. In the present embodiment, the pressure in the atmosphere transfer module 15 is maintained in an atmospheric environment. However, in another embodiment, the pressure in the atmosphere transfer module 15 may be controlled to a positive pressure, such that intrusion of particles and the like from the outside into the atmospheric transfer module 15 can be suppressed.

The controller 100 processes computer-executable instructions that cause the main body 10 to perform various steps described in the present disclosure. The controller 100 may be configured to control individual components of the main body 10 to perform various steps described herein. In one embodiment, the controller 100 may be partially or entirely included in some modules of the main body 10. The controller 100 may include, e.g., a computer 100a. The computer 100a may include, e.g., a central processing unit (CPU) 100a1, a storage device 100a2, and a communication interface 100a3. The CPU 100a1 may be configured to perform various control operations based on a program stored in the storage device 100a2. The storage device 100a2 may include a random access memory (RAM), a read only memory (ROM), a hard disk drive (HDD), a solid state drive (SSD), or a combination thereof. The communication interface 100a3 may communicate with the main body 10 through a communication line such as a local area network (LAN) or the like.

<Specific Description of End Effector 21>

Figure 5:
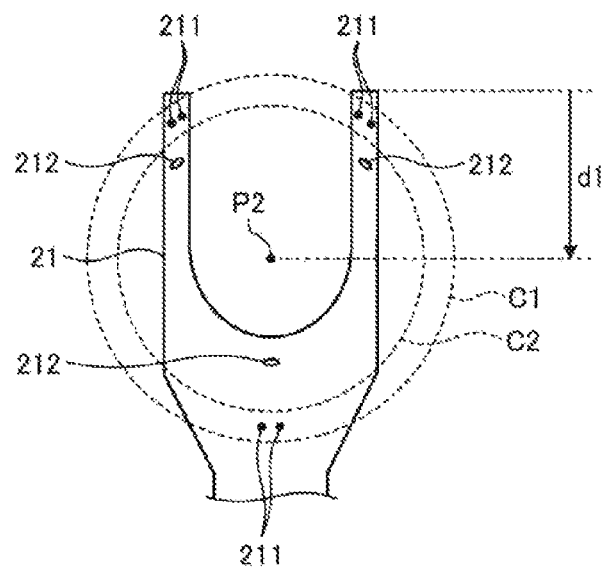
FIG. 5 is a top view showing an example of an end effector.

FIG. 5 is a top view showing an example of the end effector 21. As shown in FIG. 5, for example, a plurality of first holders 211 and a plurality of second holders 212 are disposed on an upper surface of the end effector 21. Each of the first holders 211 is formed as an elastic member such as rubber or the like and holds the edge ring ER. Each of the second holders 212 is formed as an elastic member such as rubber or the like and holds the substrate W. In the case of the transfer robot 20 disposed in the atmospheric transfer module 15, the first holder 211 and the second holder 212 may be vacuum pads that attract and hold a member by sucking air.

When the edge ring ER is placed on the end effector 21, the position of the edge ring ER is, for example, a circle C1. The edge ring ER is placed on the end effector 21 such that the center of gravity (center) of the edge ring ER is located at a position P2. The position P2 is separated from the front ends of the end effector 21 by a distance d1.

When the substrate W is placed on the end effector 21, the position of the substrate W is, for example, a circle C2. The substrate W is placed on the end effector 21 such that the center of gravity (center) of the substrate W is located at the position P2. In other words, the edge ring ER and the substrate W are held on the end effector 21 such that the center of gravity is located at the position P2.

Figure 6:
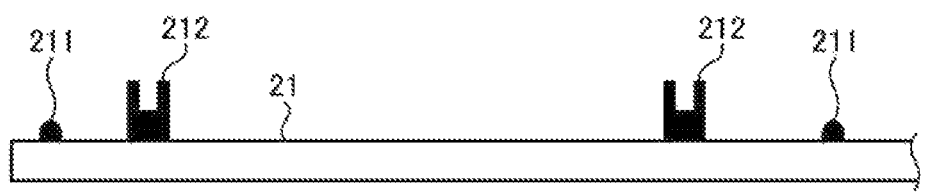
FIG. 6 is a side view showing an example of the end effector.

FIG. 6 is a side view showing the example of the end effector 21. In the present embodiment, a height of the second holder 212 is higher than a height of the first holder 211. When the edge ring ER is transferred, reaction by-products (so-called deposits) may be adhered to the transferred edge ring ER. Therefore, when the edge ring ER to which the deposits are adhered is transferred, the deposits adhered to the edge ring ER may fall onto the first holder 211 or the end effector 21 as particles.

When the substrate W is held by the first holder 211, the substrate W may be contaminated with particles that have fallen to the first holder 211. In the present embodiment, however, the substrate W is not held by the first holder 211 that holds the edge ring ER, the contamination of the substrate W can be suppressed.

Further, when the height of the second holder 212 is lower than or equal to the height of the first holder 211, the particles that have fallen from the edge ring ER to the first holder 211 and the end effector 21 may be re-adhered to the substrate W during the transfer of the substrate W. In the present embodiment, however, the height of the second holder 212 for holding the substrate W is higher than the height of the first holder 211 for holding the edge ring ER, so that the re-adhesion of the particles that have fallen on the first holder 211 and the end effector 21 to the substrate W can be suppressed.

Figure 7:
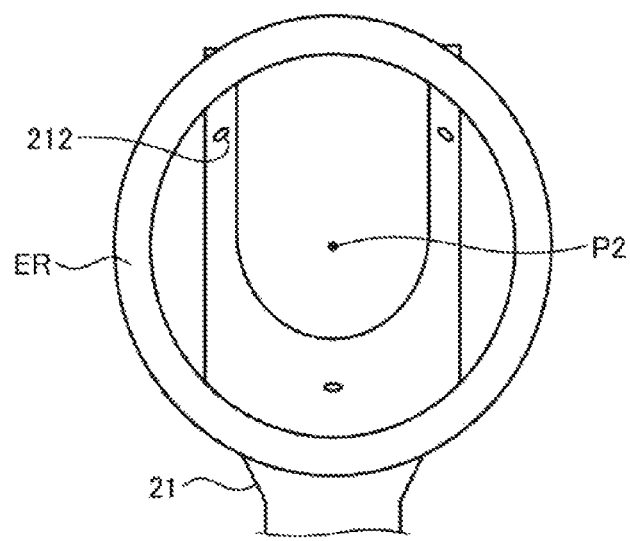
FIG. 7 is a top view showing an example of the end effector in the case of transferring an edge ring.
Figure 8:
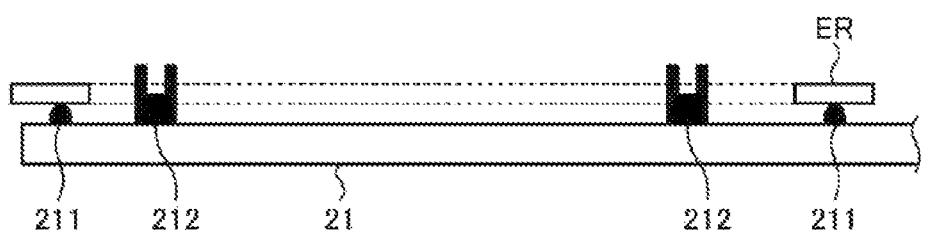
FIG. 8 is a side view showing an example of the end effector in the case of transferring the edge ring.

In the case of transferring the edge ring ER, the edge ring ER is placed on the end effector 21 as shown in FIGS. 7 and 8, for example. FIG. 7 is a top view showing the example of the end effector 21 in the case of transferring the edge ring ER. FIG. 8 is a side view showing the example of the end effector 21 in the case of transferring the edge ring ER. The diameter of the edge ring ER is greater than the diameter of the substrate W, so that the edge ring ER is held on the front ends of the end effector 21. Therefore, when the edge ring ER is held by the end effector 21, the outermost circumference of the edge ring ER coincides with the front ends of the end effector 21, or protrudes outward from the front ends of the end effector 21 as shown in FIG. 8, for example.

Figure 9:
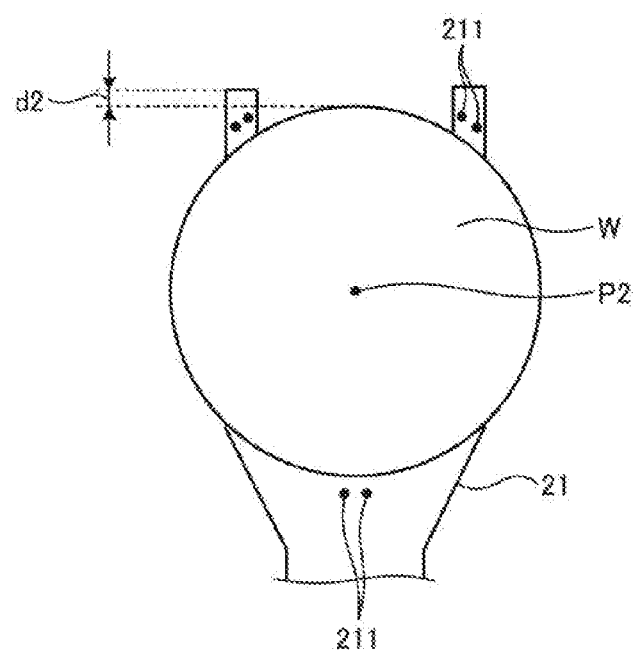
FIG. 9 is a top view showing an example of the end effector in the case of transferring a substrate.
Figure 10:
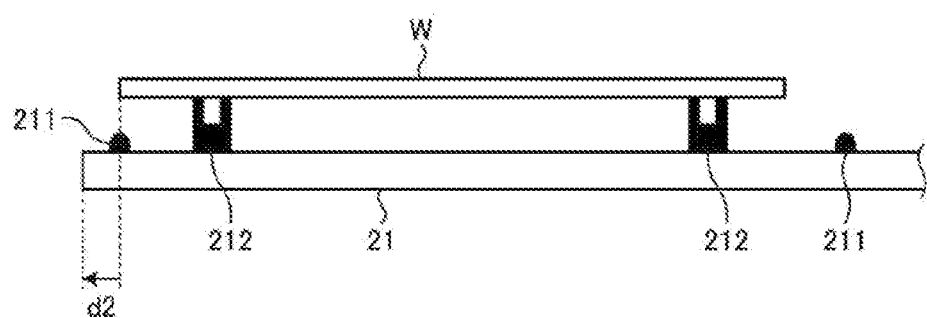
FIG. 10 is a side view showing an example of the end effector in the case of transferring the substrate.

Further, in the case of transferring the substrate W, the substrate W is placed on the end effector 21 as shown in FIGS. 9 and 10, for example. FIG. 9 is a top view showing the example of the end effector 21 in the case of transferring the substrate W. FIG. 10 is a side view showing the example of the end effector 21 in the case of transferring the substrate W. In the present embodiment, the substrate W and the edge ring ER are held by the end effector 21 such that the position of the center of gravity is located at the position P2 on the end effector 21, and the diameter of the substrate W is smaller than the diameter of the edge ring ER. Therefore, in a state where the substrate W is held by the end effector 21, the front ends of the end effector 21 protrude from the outermost circumference of the substrate W by a distance d2, as shown in FIGS. 9 and 10, for example.

Figure 11:
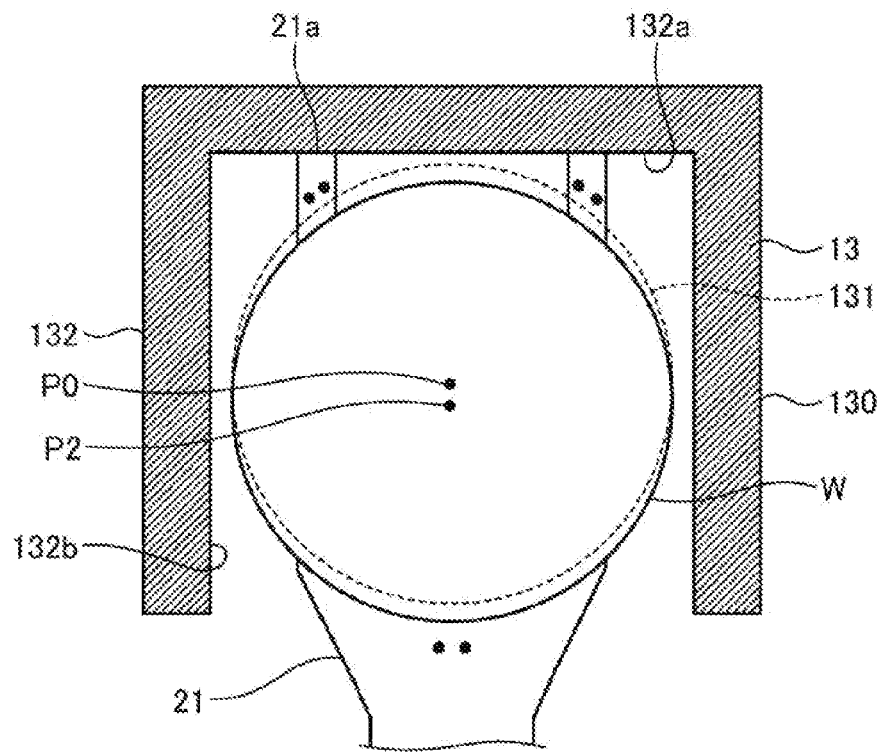
FIG. 11 shows an example of a positional relationship between the end effector and the ashing module in the case of loading the substrate into the ashing module in a comparative example.

In this specification, a case is considered as a comparative example where the ashing module 13 does not have the recess 133 on the inner surface 132a of the container 130 facing the opening 132b as shown in FIG. 11, for example. FIG. 11 shows an example of a positional relationship between the end effector 21 and the ashing module 13 in the case of loading the substrate W into the ashing module 13 in the comparative example. In the present embodiment, when the substrate W is held by the end effector 21, front ends 21a of the end effector 21 protrude from the outermost circumference of the substrate W by the distance d2. Therefore, it is difficult to load the substrate W into the ashing module 13 such that the front ends 21a of the end effector 21 are brought into contact with the sidewall of the ashing module 13 and the center of gravity of the substrate W located at the position P2 coincides with the reference position P0 of the stage 131. In the case of loading the substrate W into the ashing module 13, in order to bring the front ends 21a of the end effector 21 into contact with the sidewall of the ashing module 13, a case where the sidewall 132 of the ashing module 13 is disposed away from the stage 131 is considered. In such case, however, the container 130 is entirely scaled up, which leads to an increase in the footprint of the processing system 1.

Figure 12:
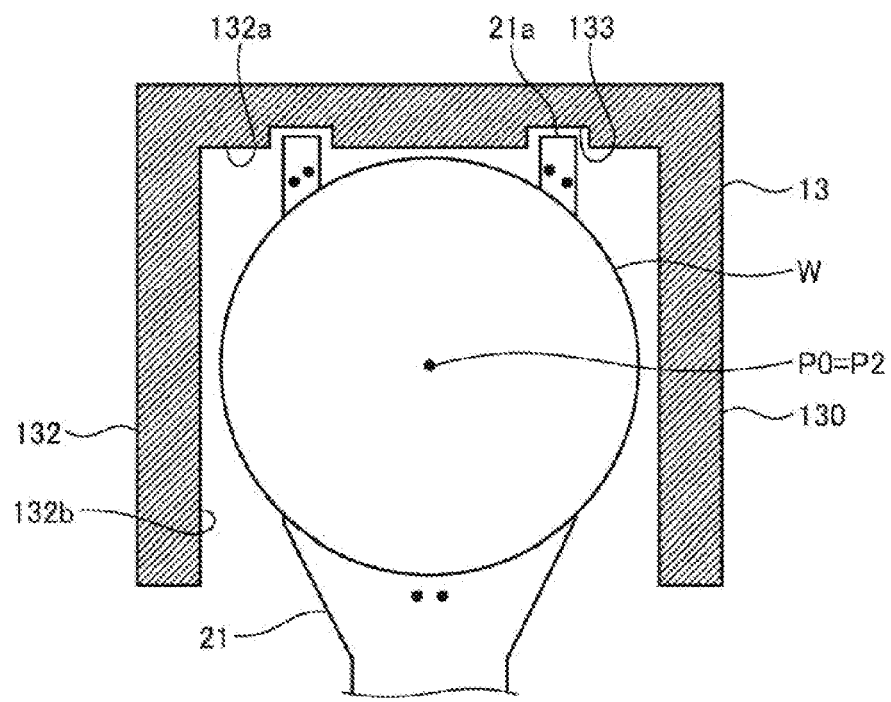
FIG. 12 shows an example of a positional relationship between the end effector and the ashing module in the case of loading the substrate into the ashing module in the first embodiment.

In the present embodiment, however, as shown in FIG. 12, for example, the recess 133 is formed on the inner surface 132a of the container 130 facing the opening 132b. FIG. 12 shows an example of a positional relationship between the end effector 21 and the ashing module 13 in the case of loading the substrate W into the ashing module 13 in the first embodiment. Accordingly, when the substrate W is loaded into the ashing module 13, the front ends 21a of the end effector 21 are inserted into the recess 133. Hence, as shown in FIG. 12, for example, the substrate W can be loaded into the ashing module 13 such that the center of gravity of the substrate W located at the position P2 coincides with the reference position P0 of the stage 131. Thus, when the substrate W is loaded into the ashing module 13, the surface 132a of the sidewall 132 needs to be away from the stage 131 in order to prevent the front ends 21a of the end effector 21 from being in contact with the sidewall of the ashing module 13. As a result, it is possible to suppress the scaling up of the container 130 and an increase in the footprint of the processing system 1.

Figure 13:
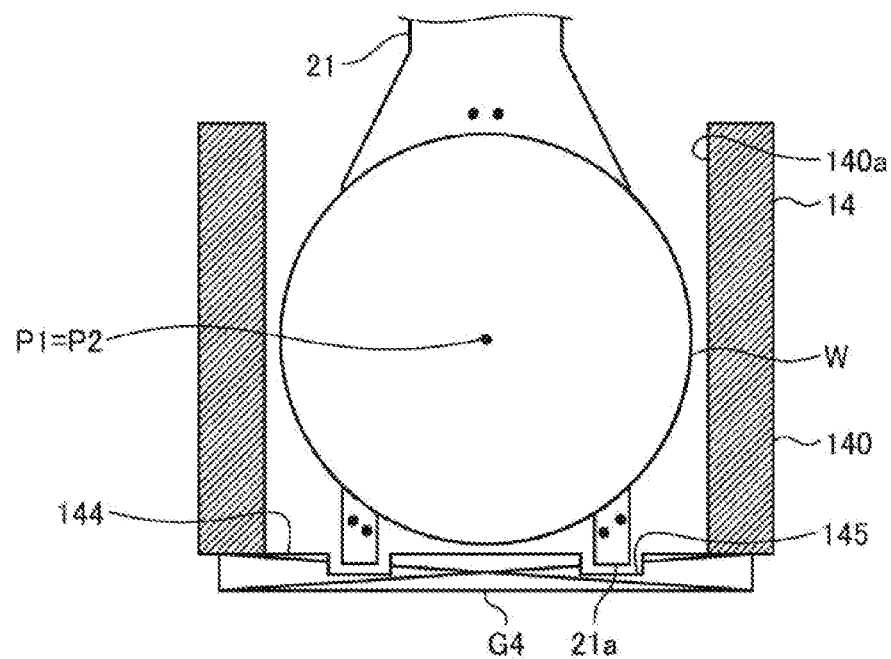
FIG. 13 shows an example of a positional relationship between the end effector and the load-lock module in the case of transferring the substrate between a vacuum transfer module and the load-lock module in the first embodiment.

Further, in the load-lock module 14 of the present embodiment, as shown in FIG. 4, for example, the recess 145 is formed on the inner surface 144 of the container 140 at the gate valve G4. Accordingly, when the substrate W is loaded into the load-lock module 14 from the vacuum transfer module 11, the front ends 21a of the end effector 21 are inserted into the recess 145 of the gate valve G4 as shown in FIG. 13, for example. FIG. 13 shows an example of a positional relationship between the end effector 21 and the load-lock module 14 in the case of transferring the substrate W between the vacuum transfer module 11 and the load-lock module 14 in the first embodiment.

Accordingly, when the substrate W is loaded into the load-lock module 14 from the vacuum transfer module 11, the substrate W can be loaded into the load-lock module 14 such that the center of gravity of the substrate W coincides with the reference position P1 of the stage 141. Hence, the gate valve G4 needs to be away from the stage 141 in order to prevent the front ends 21a of the end effector 21 from being in contact with the gate valve G4 at the time of loading the substrate W into the load-lock module 14. As a result, it is possible to suppress the scaling up of the container 140 and an increase in the footprint of the processing system 1.

Figure 14:
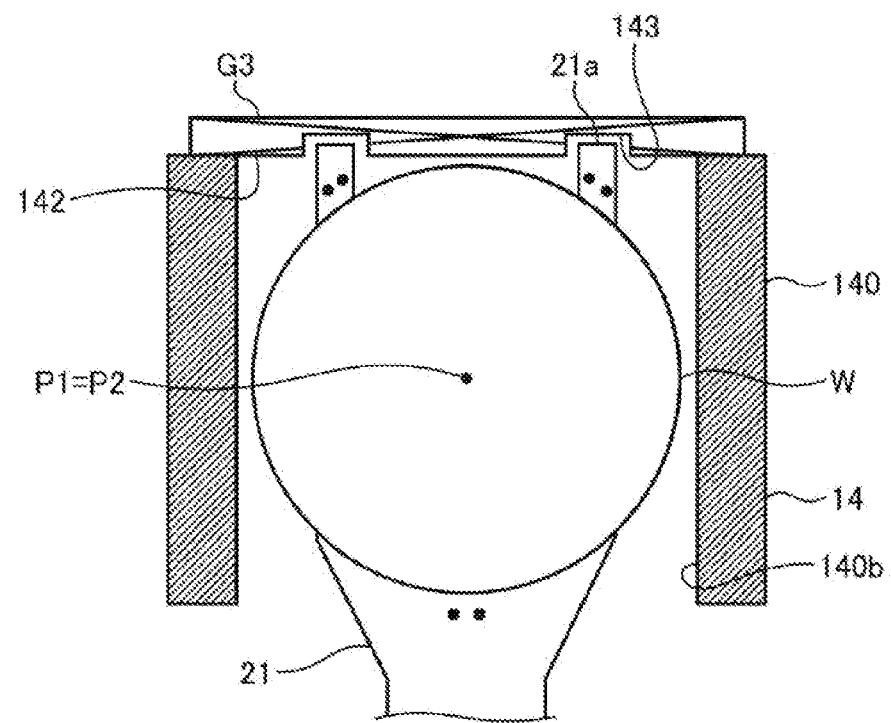
FIG. 14 shows an example of a positional relationship between the end effector and the load-lock module in the case of transferring the substrate between an atmospheric transfer module and the load-lock module in the first embodiment.

Further, in the present embodiment, as shown in FIG. 4, for example, the recess 143 is formed on the inner surface 142 of the container 140 at the gate valve G3. Therefore, when the substrate W is loaded into the load-lock module 14 from the atmospheric transfer module 15, the front ends 21a of the end effector 21 are inserted into the recess 143 of the gate valve G3, as shown in FIG. 14, for example. FIG. 14 shows an example of a positional relationship between the end effector 21 and the load-lock module 14 in the case of transferring the substrate W between the atmospheric transfer module 15 and the load-lock module 14 in the first embodiment.

Accordingly, when the substrate W is loaded from the atmospheric transfer module 15 into the load-lock module 14, the substrate W can be loaded into the load-lock module 14 such that the center of gravity of the substrate W coincides with the reference position P1 of the stage 141. Hence, when the substrate W is loaded into the load-lock module 14, it is unnecessary to place the gate valve G3 away from the stage 141 in order to prevent the front ends 21a of the end effector 21 from being in contact with the gate valve G3. As a result, it is possible to suppress the scaling up of the container 140 and an increase in the footprint of the processing system 1.

As described in the first embodiment, the processing system 1 of the present embodiment includes the processing modules 12, the transfer robot 20, and the ashing modules 13. In the processing modules 12, the substrates W are processed. The transfer robot 20 has the end effector 21 for holding a member including the substrate W and the edge ring ER disposed in the processing module 12, and transfers the member. The ashing modules 13 temporarily store the substrates. Each of the ashing modules 13 has the container 130. The sidewall 132 of the container 130 has the opening 132b through which the end effector 21 holding the substrate W passes. Further, the recess 133 into which the front ends 21a of the end effector 21 are inserted is formed on the inner surface 132a of the container 130 facing the opening 132b. With this configuration, it is possible to suppress the scaling up of the ashing module 13 and an increase in the footprint of the processing system 1.

Further, in the above-described embodiment, the recess 133 is formed on the surface 132a of the sidewall 132 of the container 130 facing the opening 132b. Accordingly, it is possible to suppress the scaling up of the ashing module 13 and an increase in the footprint of the processing system 1.

In the above-described embodiment, the substrate accommodating device may be the load-lock module 14. For example, in the load-lock module 14, the opening 140b through which another end effector 21 holding the substrate W passes is formed on the sidewall of the container 140 facing the opening 140a of the load-lock module 14. The opening 140b is provided with the gate valve G4 that opens and closes the opening 140b. The recess 145 into which the front ends 21a of the end effector 21 are inserted is formed on the inner surface 144 of the container 140 at the gate valve G4. With this configuration, it is possible to suppress the scaling up of the load-lock module 14 and suppress the increase in the footprint of the processing system 1.

Second Embodiment

In the described-above first embodiment, when the substrate W is loaded into the ashing module 13 through the opening 132b, the substrate W is loaded into the module 13 along a direction orthogonal to the surface 132a facing the opening 132b, for example. In the present embodiment, however, the substrate W is loaded into the ashing module 13 along an oblique direction with respect to the surface 132a facing the opening 132b. Accordingly, a moving distance of the substrate W can be reduced, and a time required to load the substrate W into the ashing module 13 can be shortened. Since the arm 22 of the transfer robot 20 can be shortened, the transfer robot 20 can be miniaturized.

Figure 15:
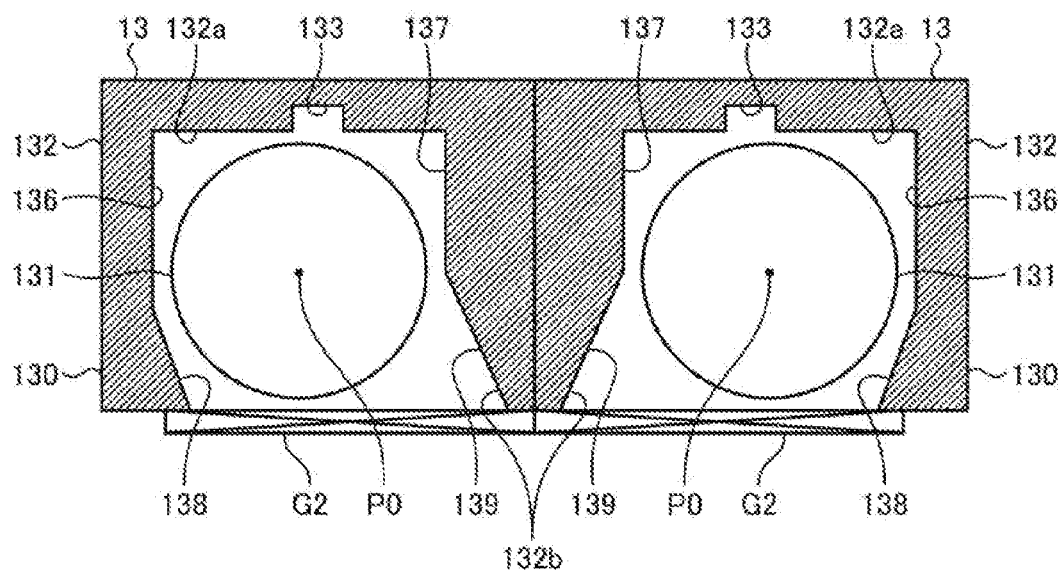
FIG. 15 is a horizontal cross-sectional view showing an example of an ashing module according to a second embodiment.

FIG. 15 is a horizontal cross-sectional view showing an example of the ashing module 13 in the second embodiment. In FIG. 15, like reference numerals will be used for like or corresponding parts as those in FIG. 3, and redundant description thereof will be omitted. In the ashing module 13 of the present embodiment, the sidewall 132 has wall surfaces 136 and 137, and tapered portions 138 and 139. The tapered portions 138 and 139 are formed on the sidewall 132 near the opening 132b to be oblique with respect to the surface 132a facing the opening 132b.

Figure 16:
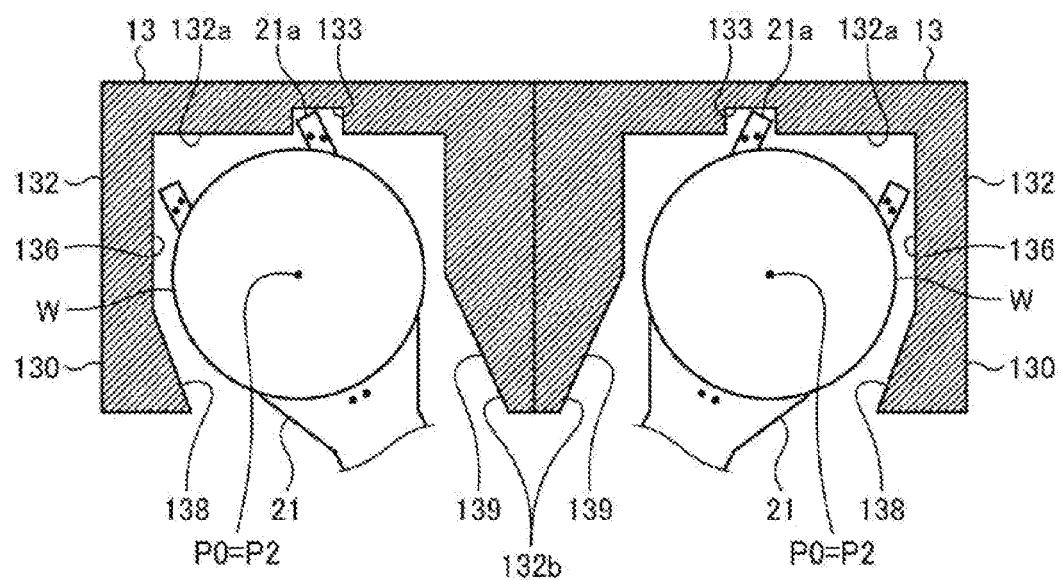
FIG. 16 shows an example of a positional relationship between the end effector and the ashing module in the case of transferring the substrate into the ashing module in the second embodiment.

In the case of transferring the substrate W into the ashing module 13, the end effector 21 holding the substrate W enters the container 130 along the tapered portions 138 and 139 as shown in FIG. 16, for example. FIG. 16 shows an example of a positional relationship between the end effector and the ashing module 13 in the case of loading the substrate W into the ashing module 13 in the second embodiment.

In the present embodiment, the substrate W is loaded into the ashing module 13 along the oblique direction with respect to the surface 132a, so that the distance between the substrate W and the front ends 21a in a direction orthogonal to the surface 132a becomes longer than that in the first embodiment. Therefore, in the present embodiment, it is more difficult to load the substrate W into the ashing module 13 such that the center of gravity of the substrate W located at the position P2 coincides with the reference position P0 of the stage 131, compared to the case of the first embodiment.

On the other hand, also in the ashing module 13 of the present embodiment, as shown in FIG. 16, for example, the recess 133 is formed on the inner surface 132a of the container 130 facing the opening 132b. Therefore, when the substrate W is loaded into the ashing module 13, the front ends 21a of the end effector 21 are inserted into the recess 133. Accordingly, as shown in FIG. 16, for example, the substrate W can be loaded into the ashing module 13 such that the center of gravity of the substrate W located at the position P2 coincides with the reference position P0 of the stage 131. Hence, as shown in FIG. 15, in the ashing module 13 having the tapered portions 138 and 139 that are oblique with respect to the surface 132a facing the opening 132b, it is particularly effective to form the recess 133 on the surface 132a.

Further, in the present embodiment, the substrate W is loaded into the load-lock module 14 along an oblique direction with respect to the gate valve G4 of the load-lock module 14. Accordingly, the moving distance of the substrate W can be reduced, and the time required to load the substrate W from the vacuum transfer module 11 into the load-lock module 14 can be shortened. Since the arm 22 of the transfer robot 20 can be shortened, the transfer robot 20 can be miniaturized.

Figure 17:
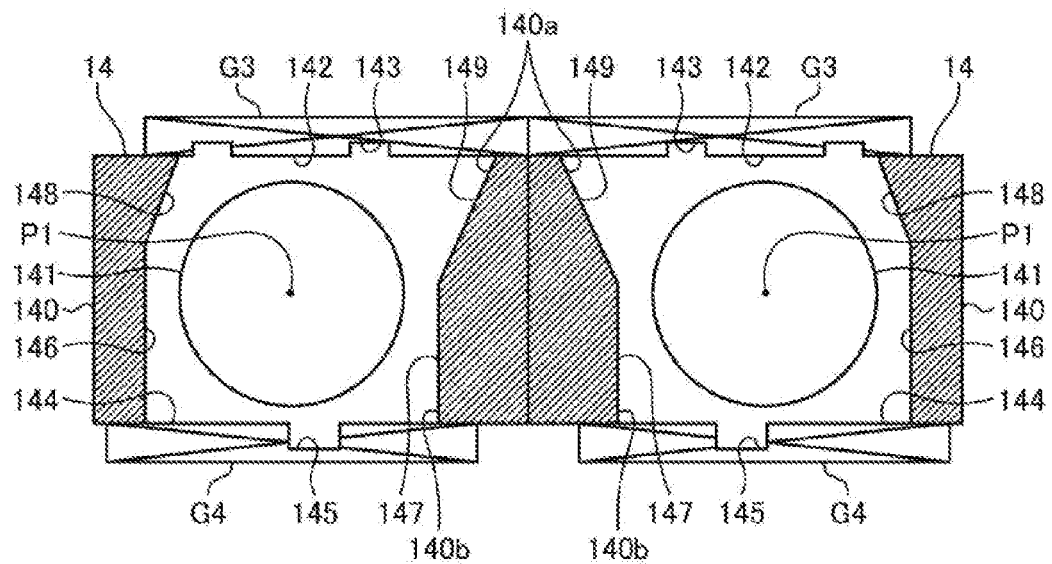
FIG. 17 is a horizontal cross-sectional view showing an example of the load-lock module according to the second embodiment.

FIG. 17 is a horizontal cross-sectional view showing an example of the load-lock module 14 in the second embodiment. In FIG. 17, like reference numerals will be used for like or corresponding part as those in FIG. 4, and redundant description thereof will be omitted. In the load-lock module 14 of the present embodiment, a tapered portion 148 is formed near the opening 140a of the sidewall 146, and a tapered portion 149 is formed near the opening 140a of the sidewall 147. The tapered portions 148 and 149 are oblique with respect to the surface 144 of the gate valve G4 facing the opening 140a.

Figure 18:
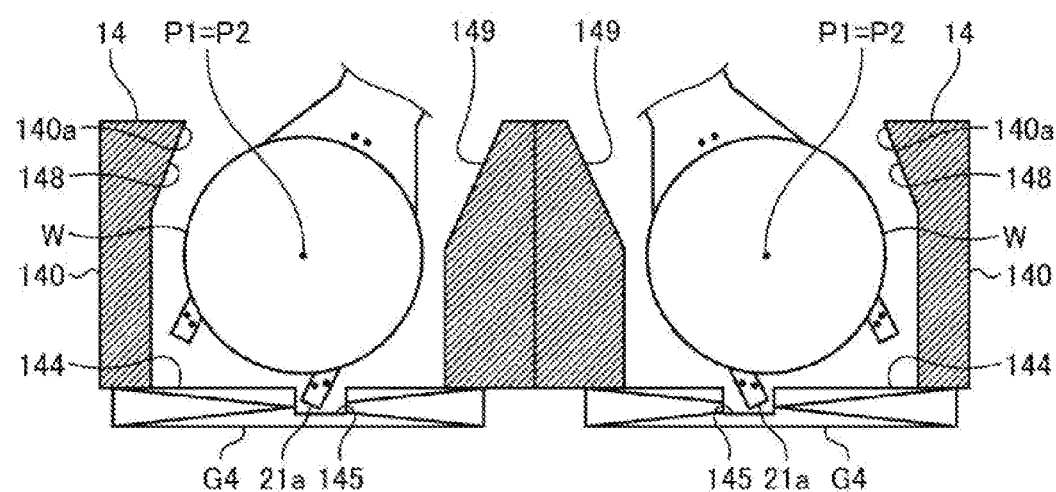
FIG. 18 shows an example of a positional relationship between the end effector and the load-lock module in the case of transferring the substrate between the vacuum transfer module and the load-lock module in the second embodiment.

In the case of transferring the substrate W from the vacuum transfer module 11 into the load-lock module 14, as shown in FIG. 18, for example, the end effector 21 holding the substrate W enters the container 140 along the tapered portions 148 and 149. FIG. 18 shows an example of a positional relationship between the end effector 21 and the load-lock module 14 in the case of transferring the substrate W between the vacuum transfer module 11 and the load-lock module 14 in the second embodiment.

In the present embodiment, the substrate W is loaded into the load-lock module 14 along the oblique direction with respect to the surface 144 of the gate valve G4, so that the distance between the substrate W and the front ends 21a in the direction orthogonal to the surface 144 of the gate valve G4 becomes longer than that in the first embodiment. Therefore, in the present embodiment, it is more difficult to load the substrate W into the load-lock module 14 such that the center of gravity of the substrate W located at the position P2 coincides with the reference position P1 of the stage 141, compared to the case of the first embodiment.

On the other hand, also in the load-lock module 14 of the present embodiment, as shown in FIG. 18, for example, a recess 145 is formed on the inner surface 144 of the gate valve G4 facing the opening 140a inside the container 140.

Therefore, when the substrate W is loaded into the load-lock module 14 from the vacuum transfer module 11, the front ends 21a of the end effector 21 are inserted into the recess 145. Accordingly, as shown in FIG. 18, for example, the substrate W can be loaded into the load-lock module 14 such that the center of gravity of the substrate W located at the position P2 coincides with the reference position P1 of the stage 141. Hence, in the load-lock module 14 having the tapered portions 148 and 149 that are oblique with respect to the surface 144 of the gate valve G4 facing the opening 140a, it is particularly effective to form the recess 145 on the surface 144 of the gate valve G4.

Figure 19:
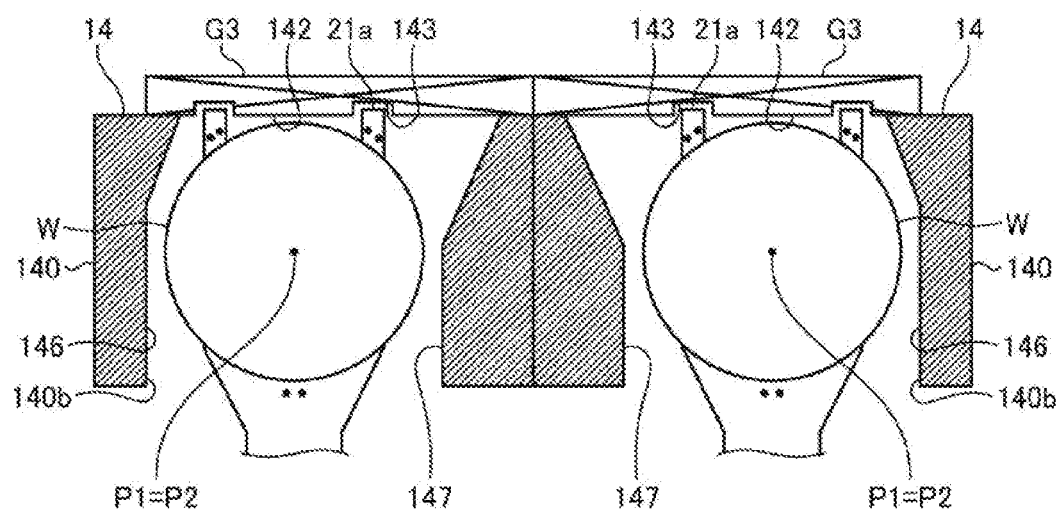
FIG. 19 shows an example of a positional relationship between the end effector and the load-lock module in the case of transferring the substrate between the atmospheric transfer module and the load-lock module in the second embodiment.

In the case of transferring the substrate W from the atmospheric transfer module 15 into the load-lock module 14, as shown in FIG. 19, for example, the end effector 21 holding the substrate W enter the container 140 along the direction facing the surface 142 of the gate valve G3. FIG. 19 shows an example of a positional relationship between the end effector 21 and the load-lock module 14 in the case of transferring the substrate W between the atmospheric transfer module 15 and the load-lock module 14 in the second embodiment. When the substrate W is transferred from the atmospheric transfer module 15 into the load-lock module 14, the front ends 21a of the end effector 21 are inserted into the recess 143 of the gate valve G3, similarly to the first embodiment. Accordingly, when the substrate W is loaded into the load-lock module 14 from the atmospheric transfer module 15, the substrate W can be loaded into the load-lock module 14 so that the center of gravity of the substrate W coincides with the reference position P1 of the stage 141.

Further, the embodiments of the present disclosure are illustrative in all respects and are not restrictive. The above-described embodiments can be embodied in various forms. Further, the above-described embodiments may be omitted, replaced, or changed in various forms without departing from the scope of the appended claims and the gist thereof.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

The invention claimed is:

1. A substrate accommodating device accommodating a substrate transferred by a transfer device having an end effector configured to hold a substrate and a member including a consumable part disposed in a substrate processing apparatus for processing the substrate, comprising:
a container including a stage on which the substrate is to be placed, wherein
a first opening through which the end effector holding the substrate passes is formed on a sidewall of the container,
a recess into which a front end of the end effector is inserted is formed on an inner surface of the container facing the first opening, and
the recess accommodates the front end of the end effector, under a condition where the end effector holding the substrate is located at a position inside the container where a center of gravity of the substrate held by the end effector and a center of gravity of the stage coincides, the front end of the end effector passing through an imaginary line of the inner surface of the container under the condition.

2. The substrate accommodating device of claim 1, wherein the recess is formed on a sidewall of the container facing the first opening.

3. The substrate accommodating device of claim 1, wherein a second opening through which another end effector holding the substrate passes is formed on a sidewall of the container facing the first opening,
the second opening is provided with a door that opens and closes the second opening, and
the recess is formed on the inner surface of the container at the door.

4. The substrate accommodating device of claim 3, wherein the substrate accommodating device is a load-lock module.

5. A processing system comprising:
a substrate processing apparatus configured to process a substrate;
a transfer device having an end effector configured to hold the substrate and a member including a consumable part disposed in the substrate processing apparatus, the transfer device being configured to transfer the substrate and the member; and
a substrate accommodating device configured to store the substrate temporarily, wherein
the substrate accommodating device has a container including a stage on which the substrate is to be placed,
a first opening through which the end effector holding the substrate passes is formed on a sidewall of the container,
a recess into which a front end of the end effector is inserted is formed on an inner surface of the container facing the first opening, and
the recess accommodates the front end of the end effector, under a condition where the end effector holding the substrate is located at a position inside the container where a center of gravity of the substrate held by the end effector and a center of gravity of the stage coincides, the front end of the end effector passing through an imaginary line of the inner surface of the container under the condition.

6. The processing system of claim 5, wherein the recess is formed on a sidewall of the container facing the first opening.

7. The processing system of claim 5, wherein a second opening through which another end effector holding the substrate passes is formed on a sidewall of the container facing the first opening,
the second opening is provided with a door that opens and closes the second opening, and
the recess is formed on the inner surface of the container at the door.

8. The processing system of claim 7, wherein the substrate accommodating device is a load-lock module.

* * * * *